(12) United States Patent
Matsumoto

(10) Patent No.: US 7,827,429 B2
(45) Date of Patent: Nov. 2, 2010

(54) FAULT TOLERANT COMPUTER

(75) Inventor: Kouichi Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 552 days.

(21) Appl. No.: 11/929,187

(22) Filed: Oct. 30, 2007

(65) Prior Publication Data
US 2008/0141060 A1 Jun. 12, 2008

(30) Foreign Application Priority Data
Dec. 12, 2006 (JP) ............................. 2006-334380

(51) Int. Cl.
*G06F 1/12* (2006.01)
*G06F 11/07* (2006.01)
(52) U.S. Cl. ........................ 713/401; 713/400; 714/11
(58) Field of Classification Search ............... 713/400, 713/401; 714/11; 711/147
See application file for complete search history.

(56) References Cited

U.S. PATENT DOCUMENTS
6,141,770 A * 10/2000 Fuchs et al. .................... 714/11
2004/0153857 A1 * 8/2004 Yamazaki et al. .............. 714/43

FOREIGN PATENT DOCUMENTS
JP 2005165599 6/2005

* cited by examiner

*Primary Examiner*—Thuan N Du

(57) ABSTRACT

A fault tolerant computer comprises a first unit, a second unit, a delay buffer and a delay time setting unit. The first unit executes a computer program in response to an input signal. The second unit executes the computer program in the same execution environment as the first unit in response to the input signal. The delay buffer controls a delay time of a timing when the input signal is input to the first unit with respect to a timing when the input signal is input to the second unit. The delay time setting unit sets the delay time to zero when receiving a synchronization mode signal and sets the delay time to be larger than zero when receiving a delay mode signal.

10 Claims, 2 Drawing Sheets

FAULT TOLERANT COMPUTER

INCORPORATION BY REFERENCE

This application is based upon and claims the benefit of priority from Japanese patent application No. 2006-334380, filed on Dec. 12, 2006, the disclosure of which is incorporated herein in its entirely by reference.

BACKGROUND OF THE INVENTION

1. Field of the Invention

The present invention relates to a technique for improving fault tolerance of a computer.

2. Description of Related Art

A fault tolerant computer has been developed in order to provide a high reliable computer. A multiplexing technique is known as a means for improving fault tolerance, which makes a plurality of units having the same function perform the same operation. According to the multiplexing technique, even when a problem arises in any of the plurality of units, a system can be operated without interruption because another unit operates normally.

A computer system is disclosed in Japanese Laid Open Patent Application JP-P2005-165599A. The computer system is provided with an active system on which a program is operating, a redundant system on which the same program is operating in the same execution environment as the active system, and a status saving means for saving a status of the redundant system at a time when fault occurs in the active system.

SUMMARY

The inventor of the present application has recognized the following points. The fault tolerant computer provided with the multiplexed units has a high tolerance for a hardware failure. However, in a case where a panic caused by malfunction due to a software failure occurs, the computer may stop operating. In such a case where the operation is stopped due to the software failure, the cause of the failure is investigated by collecting and analyzing dump. However, if a panic occurs due to inconsistent processing some time after the time of the occurrence of the software malfunction, information useful for investigating the cause may not remain.

An exemplary object of the invention is to provide a computer having a high fault tolerance for a software failure.

Another exemplary object of the invention is to provide a computer with which a cause of the software failure can be easily investigated.

In an exemplary aspect of the invention, a fault tolerant computer comprises a first unit, a second unit, a first delay buffer and a delay time setting unit. The first unit executes a computer program in response to an input signal. The second unit executes the computer program in the same execution environment as the first unit in response to the input signal. The first delay buffer controls a delay time of a timing when the input signal is input to the first unit with respect to a timing when the input signal is input to the second unit. The delay time setting unit sets the delay time to zero when receiving a synchronization mode signal and sets the delay time to be larger than zero when receiving a delay mode signal.

According to the present invention, a computer having a high fault tolerance for a software failure is provided. Moreover, a cause of the software failure can be easily investigated.

EXEMPLARY EMBODIMENTS

Exemplary embodiments of the present invention will be described below with reference to the attached drawings.

Figure 1:
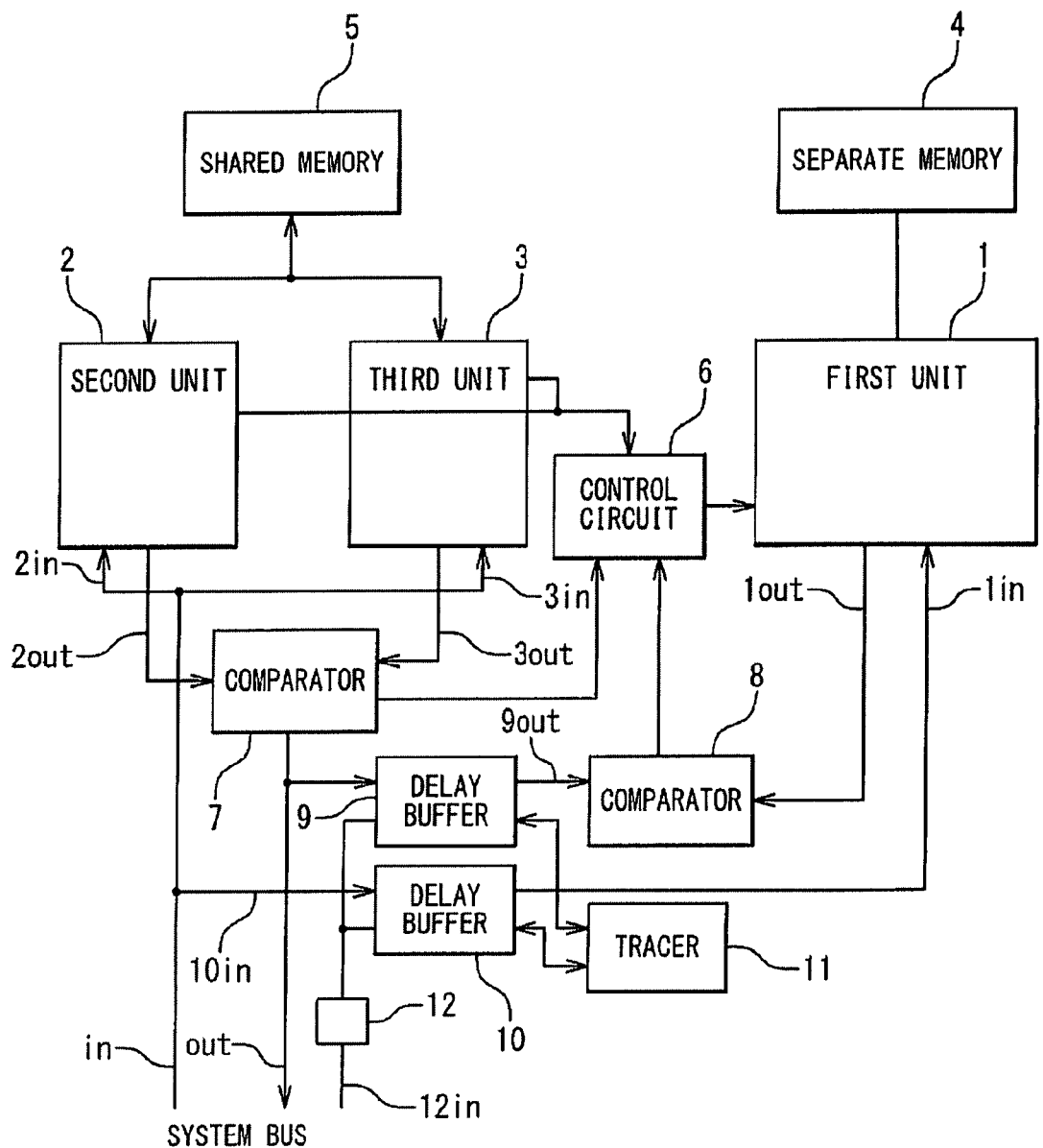
FIG. 1 shows a configuration of a fault tolerant computer according to an exemplary embodiment of the invention.

FIG. 1 shows a configuration of a fault tolerant computer according to an exemplary embodiment of the invention. The fault tolerant computer is provided with a first unit 1, a second unit 2 and a third unit 3. The first unit 1, the second unit 2 and the third unit 3 are capable of executing a computer program in the same execution environment, each of which can be mutually used as a redundant system. When the first unit 1, the second unit 2 and the third unit 3 operate normally in accordance with the same clock pulse and receive the same input signal, these three units respectively output the same output signals at the same timing. It is preferable that computers manufactured to have the same specification are respectively used as the first unit 1, the second unit 2 and the third unit 3.

The fault tolerant computer receives an input signal "in" from a system bus. The input signal "in" is distributed as a second unit input signal 2in, a third unit input signal 3in and a delay buffer input signal 10in. The second unit 2 receives the second unit input signal 2in. The third unit 3 receives the third unit input signal 3in.

Each of the second unit 2 and the third unit 3 executes a computer program in response to the input signal "in". More specifically, the second unit 2 executes the computer program transmitted by the second unit input signal 2in and outputs a second unit output signal 2out that is a result of the execution of the computer program. The third unit 3 starts to execute the computer program transmitted by the third unit input signal 3in at the same timing as the second unit 2 and outputs a third unit output signal 3out that is a result of the execution of the computer program. When data reading or data writing with respect to a memory device is necessary during the processing of the computer program, the second unit 2 and the third unit 3 perform the data reading or the data writing with respect to the same memory area in the same memory 5. The memory 5 accessible from both of the second unit 2 and the third unit 3 is hereinafter referred to as a "shared memory 5". At a time of a normal operation, operations of the second unit 2 and the third unit 3 are the same and thus it is not necessary to doubly write a data to the shared memory 5. As described above, the third unit 3 serves as a redundant system that operates in synchronization with the second unit, and vice versa.

A comparator 7 receives the second unit output signal 2out and the third unit output signal 3out, and compares the second unit output signal 2out and the third unit output signal 3out. When the second unit output signal 2out and the third unit output signal 3out are the same output signal, the comparator 7 outputs the output signal as an output signal "out" to the system bus and a delay buffer 9. On the other hand, when the second unit output signal 2out and the third unit output signal 3out are different from each other, the comparator 7 transmits an abnormal signal informing an abnormality (problem) to a control circuit 6.

A delay buffer (first delay buffer) 10 relays the delay buffer input signal 10in (input signal "in") and transmits it as a first unit input signal 1in to the first unit 1. At this time, the first unit input signal 1in output from the delay buffer 10 is delayed for a predetermined delay time (first delay time) with respect to the delay buffer input signal 10in. In other words, the first unit input signal 1in input to the first unit 1 is delayed for the predetermined delay time with respect to the input signal "in" input to the second unit 2 and the third unit 3. The delay buffer 10 controls the delay time of the timing when the first unit input signal 1in is input to the first unit 1 with respect to the timing when the second unit input signal 2 in (or the third unit input signal 3in) is input to the second unit 2 (or the third unit 3). A delay time setting unit 12 sets the delay time (first delay time) given by the delay buffer 10, in response to a delay time setting signal 12in.

The first unit 1 receives the first unit input signal 1in. The first unit 1 executes the computer program in response to the first unit input signal 1in. More specifically, the first unit 1 executes the computer program transmitted by the first unit input signal 1in and outputs a first unit output signal 1out that is a result of the execution of the computer program. When data reading or data writing with respect to a memory device is necessary during the processing of the computer program, the first unit 1 performs the data reading or the data writing with respect to a separate memory 4. The separate memory 4 is independent of the above-mentioned shared memory 5. That is to say, the separate memory 4 is accessible from the first unit 1 but is inaccessible from the second unit 2 and the third unit 3.

A delay buffer (second delay buffer) 9 relays the output signal "out" output from the comparator 7 and outputs it as a delay buffer output signal 9out to a comparator 8. At this time, the delay buffer output signal 9out output from the delay buffer 9 is delayed for a predetermined delay time (second delay time) with respect to the output signal "out". In other words, the delay buffer output signal 9out input to the comparator 8 is delayed for the predetermined delay time with respect to the output signal "out". The delay time setting unit 12 sets the delay time (second delay time) given by the delay buffer 9, in response to a delay time setting signal 12in. It should be noted that the delay time (second delay time) in the delay buffer 9 is set to be equal to the delay time (first delay time) in the above-mentioned delay buffer 10. That is, the delay time setting unit 12 sets the second delay time given by the delay buffer 9 to be equal to the first delay time given by the delay buffer 10.

The comparator 8 receives the delay buffer output signal 9out and the first unit output signal 1out and compares the delay buffer output signal 9out and the first unit output signal 1out. In other words, the comparator 8 compares the first unit output signal 1out output from the first unit 1 with the output signal "out" which is relayed by the delay buffer 9. When the delay buffer output signal 9out and the first unit output signal 1out are the same, the comparator 8 recognizes that processing is normally performed. On the other hand, when the delay buffer output signal 9out and the first unit output signal 1out are different from each other, the comparator 8 transmits an abnormal signal informing an abnormality (problem) to the control circuit 6.

In a case when fault such as a panic and the like caused by malfunction due to a software failure occurs in the second unit 2, the second unit 2 transmits an abnormal signal informing the abnormality (problem) to the control circuit 6. Similarly, in a case when fault such as a panic and the like caused by malfunction due to a software failure occurs in the third unit 3, the third unit 3 transmits an abnormal signal informing the abnormality (problem) to the control circuit 6.

When fault such as a panic occurs in the fault tolerant computer, the control circuit 6 receives the above-mentioned abnormal signal from the second unit 2, the third unit 3, the comparator 7, or the comparator 8. In this case, the control circuit 6 stops the execution of the computer program by the first unit 1. Moreover, the control circuit 6 acquires and holds temporary data accumulated in the first unit 1 and data recorded on the separate memory 4. Thus, the control circuit 6 serves as a delay information acquisition unit for acquiring information of the first unit 1 when the fault occurs in the fault tolerant computer.

The delay buffer 9 and the delay buffer 10 are connected with a tracer 11. The tracer 11 stores for a predetermined period of time a history of the output signal "out" delayed by the delay buffer 9 and a history of the delay buffer input signal 10in delayed by the delay buffer 10. When the control circuit 6 receives the abnormal signal, the control circuit 6 makes the tracer 11 hold the information stored in the tracer 11 at that time.

The fault tolerant computer thus configured operates as follows. The fault tolerant computer receives the input signal "in" transmitting the computer program from the system bus. The second unit 2 and the third unit 3 execute the computer program at the same timing. Since the second unit 2 and the third unit 3 perform the same operation concurrently with each other, the input/output data of the respective units 2 and 3 are normally the same with each other. That is to say, the second unit output signal 2out and the third unit output signal 3out are the same with each other in the normal operation. Therefore, the comparator 7 compares the second unit output signal 2out and the third unit output signal 3out to confirm that the both units 2 and 3 are operating correctly.

The first unit 1 executes the same computer program the predetermined delay time after the second unit 2 and the third unit 3. Therefore, the timing of the data input/output of the first unit 1 is late with respect to the timing of the data input/output of the second unit 2 and the third unit 3. The data input from the system bus to the first unit 1 is delayed by the delay buffer 10 to be adjusted to match the operation timing of the first unit 1.

The first unit output signal 1out output from the first unit 1 is input to the comparator 8. Also, the delay buffer output signal 9out, which is the output data of the second unit 2 and the third unit 3 delayed by the delay buffer 9 for the delay time of the operation of the first unit 1, is input to the comparator 8. The comparator 8 makes a comparison between the first unit output signal 1out and the delay buffer output signal 9out. By the comparison, it can be confirmed that the first unit 1 is operating normally.

Figure 2:
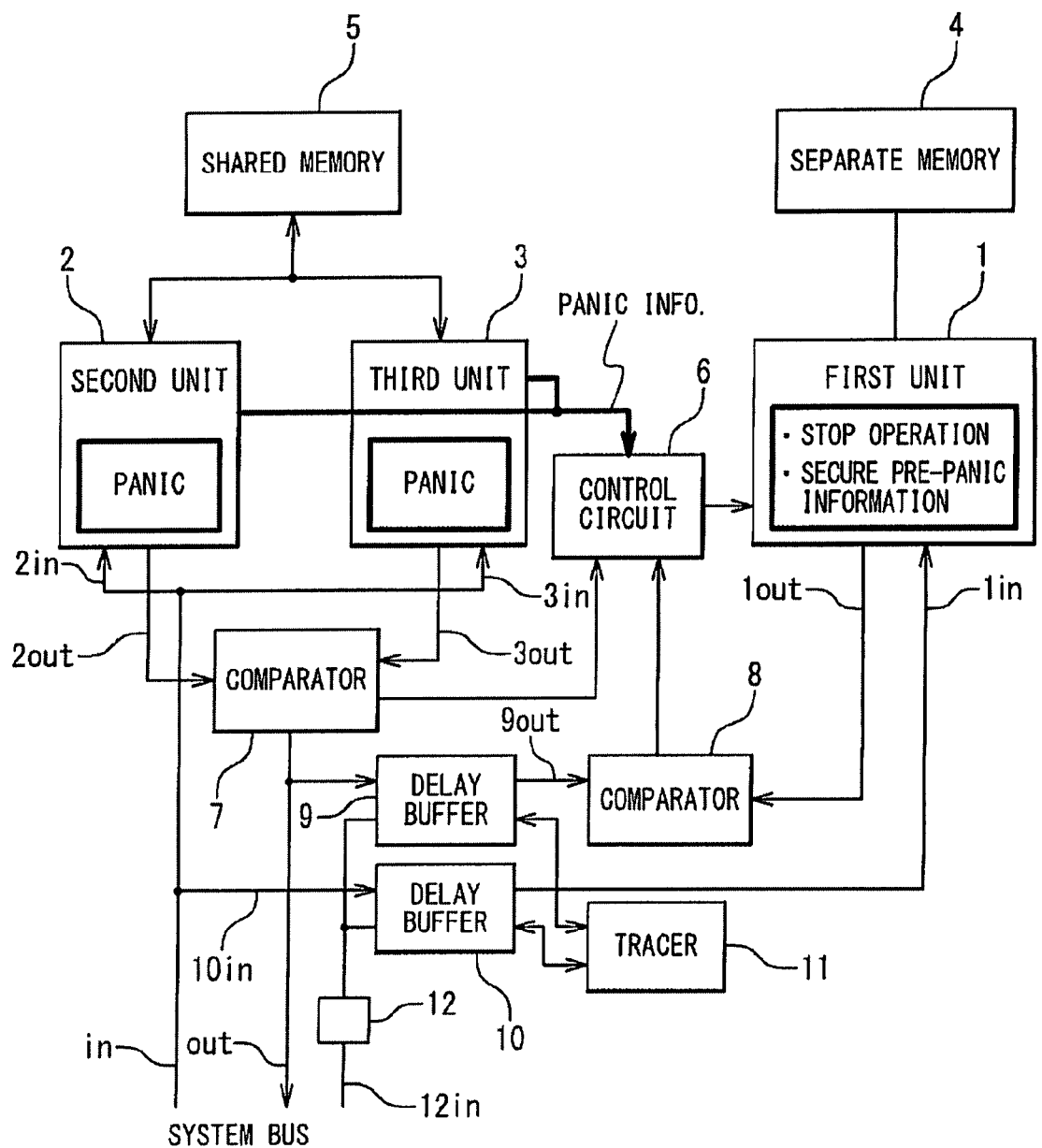
FIG. 2 shows a case where fault such as a panic and the like occurs in the fault tolerant computer according to the exemplary embodiment.

FIG. 2 shows a case where fault such as a panic caused by malfunction due to a software failure occurs in the second unit 2 or the third unit 3 of the fault tolerant computer shown in FIG. 1. When the panic or the like occurs, the abnormal signal is informed to the control circuit 6. An operation described below can be similarly applied to a case where the comparator 7 or the comparator 8 generates the abnormal signal.

When receiving the abnormal signal, the control circuit 6 instructs the first unit 1 to stop operating. Moreover, the control circuit 6 (delay information acquisition unit) obtains information of the first unit 1 and the separate memory 4 at the time when the first unit 1 stops operating. Since the first unit 1 has been operated later than the second unit 2 and the third unit 3, the first unit 1 is executing a processing that was executed by the second unit 2 and the third unit 3 prior to the occurrence of the panic or the like. Therefore, it is expected that the first unit 1 retains data and status which may be already modified in the second unit 2 and the third unit 3. Since the separate memory 4 is accessible only from the first unit 1, data in the separate memory 4 is prevented from being modified by the malfunction of the second unit 2 or the third unit 3.

In an investigation of the cause of the fault, the investigation by the use of information obtained from the second unit 2 and the third unit 3 may be difficult because data and status necessary for investigating the cause may have been modified as the time passes from the occurrence of the malfunction. Even in this case, data and status obtained from the first unit 1 can be those at a time prior to the occurrence of the malfunction. In this case, it is possible to trace a condition where the malfunction occurs by the use of the obtained data and status.

Furthermore, the tracer 11 stores the input/output data between the first unit 1 and the system bus. By using the input/output data, it is possible to reproduce an operation from a time when the control circuit 6 stops the operation of the first unit 1 to a time when the panic or the like occurs in the second unit 2 or the third unit 3. Such the reproduction helps to investigate the cause of the panic or the like.

As described above, according to the fault tolerant computer in the exemplary embodiment, each of the second unit 2 and the third unit 3 serves as the redundant system with each other in the normal operation. Thus, a computer having a high fault tolerance with respect to a hardware failure can be provided. Furthermore, in the case where fault such as a panic occurs due to the malfunction of the software and even if information useful for investigating the cause of the fault has been modified because an inconsistent processing is detected some time after the occurrence of the software malfunction, it is possible to obtain useful information at a time point prior to the modification by using the first unit 1 that performs the same operation with a predetermined delay time. Therefore, it becomes possible to easily investigate the cause.

The fault tolerant computer can be used with switching the above-mentioned delay time as follows. In a normal operation mode (synchronization mode), the delay time setting signal 12 in is a synchronization mode signal. In this case, the delay time setting unit 12 sets the above-mentioned delay times of the delay buffers 9 and 10 to "zero". Then, the first unit 1, the second unit 2 and the third unit 3 operate concurrently with each other. At this time, the fault tolerant computer is provided with a plurality of redundant systems and hence operates as a robust computer with respect to a hardware failure. On the other hand, in a case where there is a possibility that a panic or the like occurs in the computer due to malfunction of the software, the computer is set to a delay mode. In the delay mode, the delay time setting signal 12 in is a delay mode signal that specifies a predetermined delay time larger than 0. Such the delay time setting signal 12 in is transmitted to the delay time setting unit 12, and the delay time setting unit 12 sets the above-mentioned delay times of the delay buffers 9 and 10 to a value different from zero, i.e. a value larger than zero. When the computer program is executed under this condition and a panic or the like occurs, the pre-panic information can be obtained (secured) from the first unit 1 and the separate memory 4 as described above. The cause of the panic or the like can be easily investigated by the use of the obtained pre-panic information.

The third unit 3 can be eliminated from the fault tolerant computer shown in FIG. 1 or FIG. 2. Even in this case, the above-described switching of the delay time is still effective. With regard to the fault tolerant computer in this case, each of the first unit 1 and the second unit 2 serves as the redundant computer with each other, when the delay time is set to zero. At this time, the computer is robust with respect to a hardware failure. On the other hand, when the delay time is set to a value larger than zero, the computer is effective for easily investigating the cause of a software failure, as described above.

It will be obvious to one skilled in the art that the present invention may be practiced in other embodiments that depart from the above-described specific details. The scope of the present invention, therefore, should be determined by the following claims.

What is claimed is:

1. A fault tolerant computer comprising:
   a first unit configured to execute a computer program in response to an input signal;
   a second unit configured to execute said computer program in a same execution environment as said first unit in response to said input signal;
   a first delay buffer configured to control a first delay time of a timing when said input signal is input to said first unit with respect to a timing when said input signal is input to said second unit; and
   a delay time setting unit configured to set said first delay time to zero when receiving a synchronization mode signal and to set said first delay time to be larger than zero when receiving a delay mode signal.

2. The fault tolerant computer according to claim 1, further comprising a delay information acquisition unit configured to acquire information of said first unit when fault occur in said second unit.

3. The fault tolerant computer according to claim 2, further comprising:
   a second delay buffer configured to relay an output of said second unit; and
   a comparator configured to compare an output of said first unit with said output of said second unit which is relayed by said second delay buffer,
   wherein said delay time setting unit sets a second delay time given by said second delay buffer to be equal to said first delay time.

4. The fault tolerant computer according to claim 2, further comprising a third unit as a redundant system that operates in synchronization with said second unit.

5. The fault tolerant computer according to claim 4, further comprising:
   a shared memory including a memory area that is accessible from both of said second unit and said third unit; and
   a separate memory that is accessible from said first unit and inaccessible from said second unit and said third unit.

6. The fault tolerant computer according to claim 1, further comprising:
   a second delay buffer configured to relay an output of said second unit; and
   a comparator configured to compare an output of said first unit with said output of said second unit which is relayed by said second delay buffer,
   wherein said delay time setting unit sets a second delay time given by said second delay buffer to be equal to said first delay time.

7. The fault tolerant computer according to claim 6, further comprising a third unit as a redundant system that operates in synchronization with said second unit.

8. The fault tolerant computer according to claim 7, further comprising:

a shared memory including a memory area that is accessible from both of said second unit and said third unit; and a separate memory that is accessible from said first unit and inaccessible from said second unit and said third unit.

9. The fault tolerant computer according to claim 1, further comprising a third unit as a redundant system that operates in synchronization with said second unit.

10. The fault tolerant computer according to claim 9, further comprising:

a shared memory including a memory area that is accessible from both of said second unit and said third unit; and a separate memory that is accessible from said first unit and inaccessible from said second unit and said third unit.

* * * * *